Patented Nov. 23, 1926.

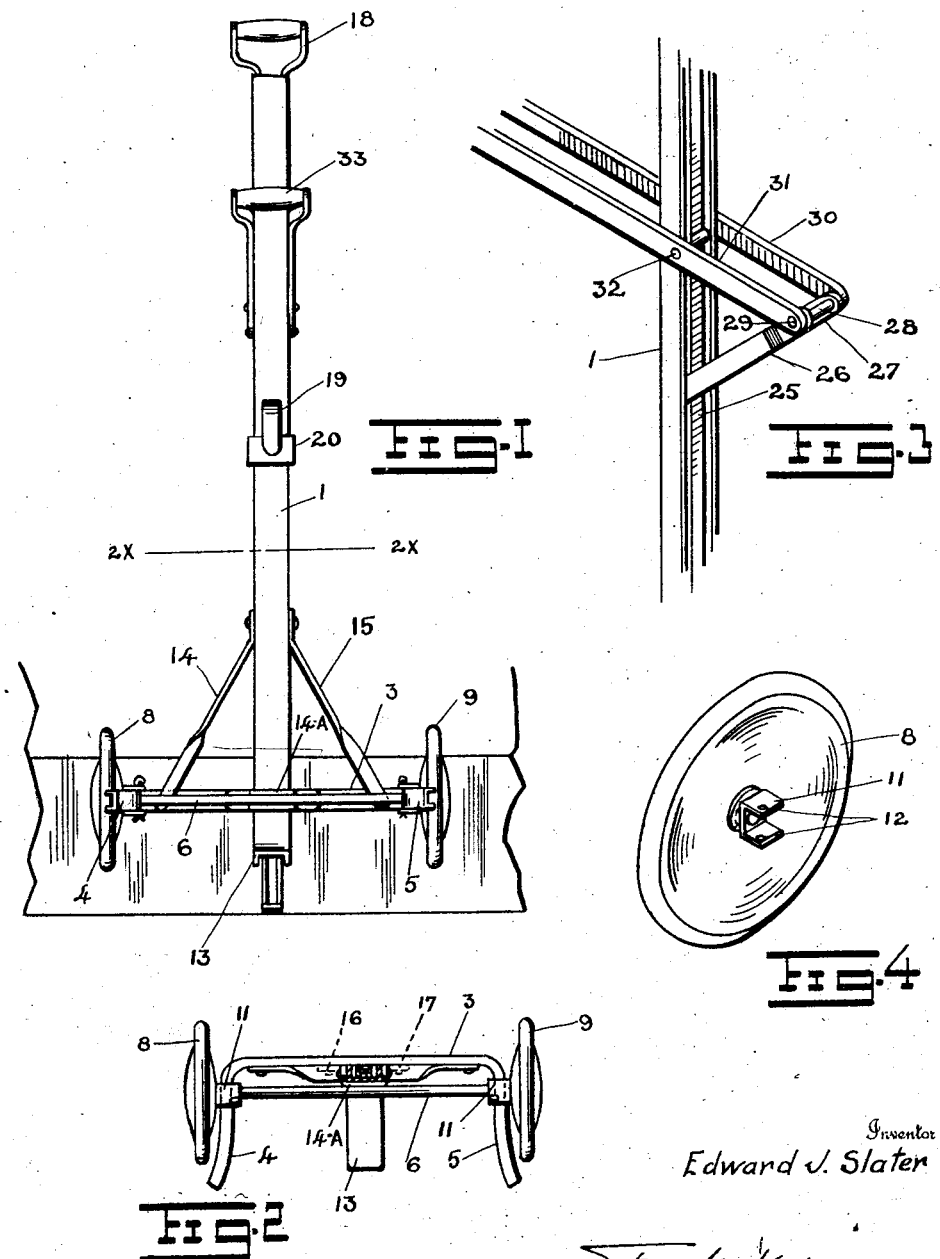

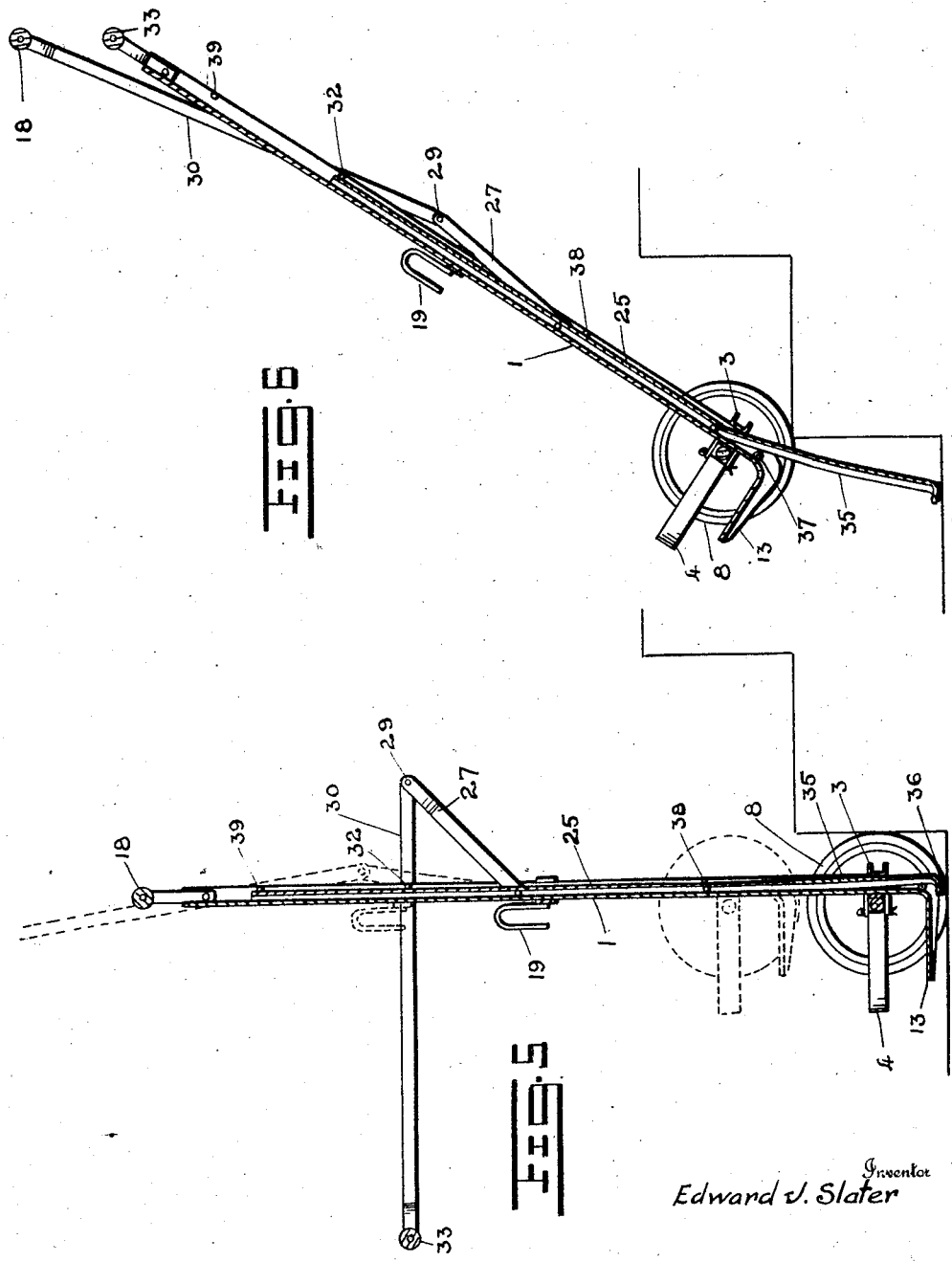

1,607,851

UNITED STATES PATENT OFFICE.

EDWARD J. SLATER, OF ROCHESTER, NEW YORK.

HAND TRUCK.

Application filed May 29, 1925. Serial No. 33,826.

The object of this invention is to provide a new and improved type of hand truck especially useful for handling and transporting filled ash cans.

Another object of this invention is to so construct this truck that it can be easily raised up, step by step, any steps or stairs.

These and other objects of this invention will be fully illustrated in the drawings, described in the specification and pointed out in the claims at the end thereof.

In the accompanying drawings:

Figure 1 is a front elevation of the hand truck.

Figure 2 is a horizontal section of the truck, the section being taken on the line 2x—2x of Figure 1.

Figure 3 is an enlarged detail perspective view of the toggle levers for raising the truck.

Figure 4 is a detail perspective view of one of the wheels of the truck.

Figure 5 is a longitudinal sectional view of the truck showing the truck in position for elevating the ash can supported thereon from the floor or ground level to the top of the first step.

Figure 6 is a similar sectional view of the truck after the ash can has been lifted the height of the first step and is ready to be rolled over the edge thereof to the rear of the step so that the truck can be raised to the next step.

In the several figures of the drawings like reference numerals indicate like parts.

The hand truck forming the subject matter of my present invention is especially adapted for handling ash cans and is used for transporting the filled ash cans from the furnace to the stairs, up the stairs and out of the house to a storage or other suitable place where the ash cans will be emptied by the ash collectors. While the truck is especially adapted for this purpose it, of course, can be used for handling other things making the truck a very useful addition to the many labor saving devices now used around the home.

As illustrated in the drawings the truck comprises the central supporting bar 1 formed by an inverted metal channel. To this bar is fastened near the lower end thereof a cradle comprising the cross bar 3 forming the bottom thereof and the upwardly and outwardly turned ends 4 and 5 forming the sides of the cradle. In the sides of the cradle are provided suitable bearings in which the axle 6 is supported. The outer ends of the axle project from the sides and have the wheels 8 and 9 mounted thereon. These wheels are preferably supported on roller bearings and are held in place on the axle in any suitable manner. The particular manner illustrated in the figures of the drawing in which the wheels are fastened to the axle comprises a suitable sleeve that supports the roller bearing so that the wheels can freely rotate thereon. The sleeves are provided with yokes 11 that are adapted to engage over the sides 4 and 5 of the cradle while the ends of axle 6 projects into the sleeves. A cotter pin or other suitable pin is inserted thru a pair of holes 12, 12 provided in the yoke 11 and passes from one side of the yoke to the other side thereof at the inside of the sides of the cradle and thus hold the yoke with the wheel firmly anchored thereto.

The lower end of the supporting bar 1 is turned up and forms a supporting flange 13 on which the ash can to be handled is supported. A pair of angular braces 14 and 15 are attached to the cross bar 3 at a suitable distance from the supporting bar 1 and are fastened to the sides of the supporting bar above the cross bar 3. In addition to this the cross bar 3 is fastened to the supporting bar by the yoke 14ᴬ which embraces the top and sides of the supporting bar and is riveted to the cross bar by means of the flanges 16 and 17.

The upper end of the supporting channel is provided with the handle 18 by means of which the truck is pulled or pushed. A hook 19 is carried on the supporting bar 1 and is provided with the sleeve 20 that embraces the supporting bar and allows the hook to slide up and down thereon. The ash can to be handled by the truck is placed on top of the supporting flange 13 of the supporting bar and is allowed to rest between the sides 4 and 5 of the cradle thereof, while the hook 19 is moved on the supporting bar until it engages over the rim of the ash can to hold the upper end thereof against the supporting bar 1. After the ash can has been placed on the truck and is held thereon by the hook 19 as above described the hand truck is ready to be tilted and rolled over the floor or ground, being easily handled in so doing by but one person.

When the truck is to be taken up a step or stairs its lifting mechanism is brought into operation. This mechanism comprises a sliding rod 25 mounted within the channel forming the supporting bar 1. At a suitable point intermediate of this bar are pivotally attached a pair of parallel links 26 and 27. These links are spread at their outer ends and are held apart by a sleeve 28. A pivot pin 29 passes thru this sleeve and the ends of the links 26 and 27 and on this pivot pin are mounted the ends of the parallel levers 30 and 31. These levers are pivoted on the pivot pin or bolt 32 carried by the supporting bar 1. The outer ends of these levers are held together by the handle 33 by means of which they are swung in unison on the supporting bar to operate the lifting mechanism. As illustrated the ends of the levers 30 and 31 together with the links 26 and 27 form a pair of toggle levers one end of which is pivoted to the supporting bar by means of the pivot pin or bolt 32 while the other ends of the toggle levers are pivoted to the sliding bar 25. When therefore the levers 30 and 31 are swung on the supporting bar from the position illustrated in Figure 5 to the position illustrated in Figure 6 the sliding bar 25 is forced downwardly. To the lower end of the sliding bar is pivoted the foot 35. This foot extends slightly below the supporting bar 1 and its lower end is upturned and has a rubber pad 36 attached thereto. When the levers 30 and 31 are moved as above described the foot 35 is forced downwardly against the floor or ground with the result that the supporting bar with the cradle and the ash can supported thereon is raised from the full line position to the dotted line illustrated in Figure 5. This raises the wheels of the truck from the level of the ground or floor to the level of the next step so that by pulling the truck toward the rear after it has been raised, the wheels of the truck with the ash can supported thereon can be rolled back on the next step to be supported thereon. By repeating the operation the truck with the ash can is raised from this step to the next step and so on until the truck and the ash can have been moved the full length of the stairs. After this is done the truck can be rolled away to deposit the ash can at the desired point.

As illustrated in Figures 5 and 6 the foot 35 slides within the channel forming the supporting bar and is guided in its movement by the roller 37 mounted in the supporting bar near the lower end thereof and located on the inside of the foot, and by the cross bar 3 located on the outside of the bar at a point above the roller 37.

The sliding rod 25 is guided in its movement and held in place in the supporting bar by the pins 38 and 39 one near each end of the sliding bar and the pivot pin or bolt 32 at or near the middle of the sliding bar. These pins bridge the channel forming the supporting bar at the back of the sliding bar and keep the bar in place within the channel as well as provide bearing members therefor.

I claim:

1. In a hand truck, the combination of a central supporting member, a cradle formed at the lower end of said supporting member, a wheel mounted on each side of said cradle, a sliding foot member within said central supporting member, and mounted to slide parallel thereto and means for forcing said foot member downwardly to raise said central supporting member and the cradle formed thereon.

2. In a hand truck, the combination of a central supporting member, wheels mounted on the lower end of said supporting member, a rod mounted to slide on said supporting member, a foot attached to the lower end of said sliding rod, toggle levers connecting said sliding rod with said supporting member and means for operating said toggle levers to slide said rod along said supporting member and force said foot member away from said supporting member into engagement with the floor raising and supporting said supporting member with its wheels above the floor.

3. In a hand truck, the combination of a central supporting member, a cradle provided near the lower end of said supporting member, a wheel provided on each side of said cradle, a supporting flange on the lower end of said supporting member, a rod mounted to slide on said supporting member, a foot member connected to the lower end of said rod and adapted to project below said supporting member, a lever pivoted to said supporting member having one end projecting from one side of said supporting member and the other end projecting from the other side of said supporting member, a link connecting one end of said lever with said rod to move said rod on the swinging of said lever and force said foot member into engagement with the floor to raise said supporting member from the floor and support it at a predetermined height above the floor.

4. In a hand truck, the combination of a central supporting member, a pair of wheels mounted on said supporting member near one end with a wheel on each side thereof, a rod mounted to slide on said supporting member, a foot member pivoted to the lower end of said rod, said rod being adapted to force said foot member against the floor and raise said supporting member from the floor and allow the supporting member to tilt on said foot member to one side after it has been raised from the floor.

5. In a hand truck, the combination of a supporting member, a cross member carried by said supporting member, wheels mounted on said cross member, a foot member mounted to slide on said supporting member, a fixed handle and a swinging handle on said supporting member, a link connecting said swinging handle with said foot member, said swinging handle raising or lowering said supporting member on said foot member on the swinging thereof on said supporting member.

In testimony whereof I affix my signature.

EDWARD J. SLATER.